United States Patent Office 2,961,829
Patented Nov. 29, 1960

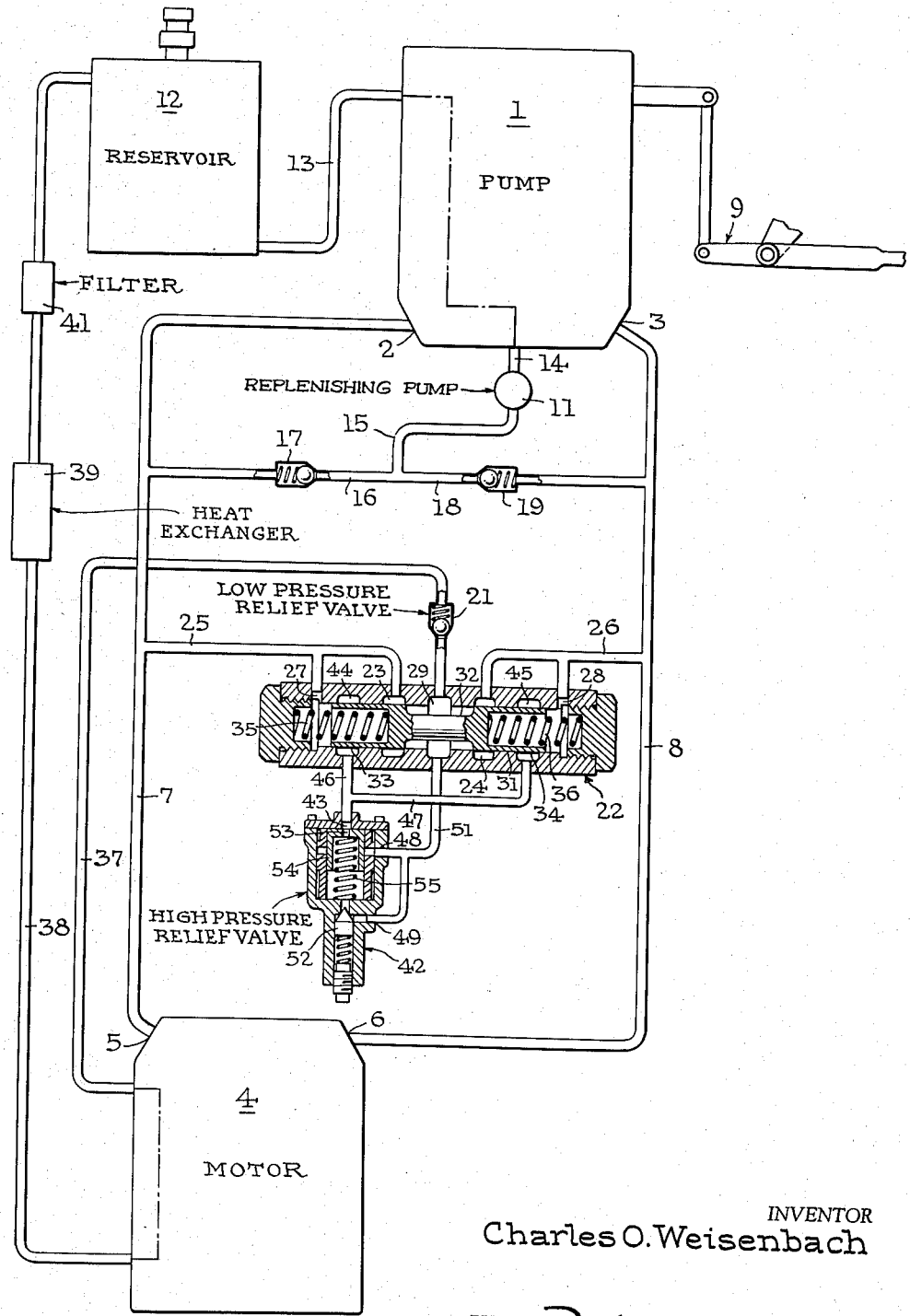

2,961,829

HYDRAULIC TRANSMISSION

Charles O. Weisenbach, Watertown, N.Y., assignor to The New York Air Brake Company, a corporation of New Jersey Filed Oct. 15, 1959, Ser. No. 846,620

4 Claims. (Cl. 60—53)

This invention relates to hydraulic transmissions of the closed system type, that is, those transmissions in which the suction and discharge ports of the pump are connected directly with the outlet and inlet ports, respectively, of the motor.

In this type of system, it is necessary to provide some means for replacing the oil which leaks from the system at the pump and the motor. Furthermore, since the horsepower being transmitted by the device is relatively large in relation to the total oil capacity of the system, some mechanism must be provided for cooling the oil.

It is the object of this invention to provide an hydraulic transmission including mechanism for both replenishing the leakage oil and cooling the oil in the closed system.

The preferred embodiment of the invention will be described in relation to the accompanying drawing which is a schematic diagram of the transmission.

As shown in the drawing, the transmission comprises a reversible variable displacement pump 1 having a pair of ports 2 and 3, a constant displacement motor 4 having a pair of ports 5 and 6, and a pair of conduits 7 and 8 connecting the ports 2 and 5 and the ports 3 and 6, respectively. The pump 1 can take several different forms; it being required only that it be capable of discharging through either the port 2 or the port 3 while employing the remaining port as the suction port. In some pumps, this reversing of the functions of the two ports is accomplished by reversing the direction of rotation of the drive shaft while, in other pumps, reversibility is achieved by means of a reversing valve. In still other pumps, such as the rotary cylinder barrel longitudinally reciprocating piston pump which employs a cam plate for moving the pistons on their discharge strokes and for governing the length of these strokes, the direction of flow through the pump is reversed by moving the cam plate to opposite sides of a neutral or zero stroke-establishing position. The pump illustrated in the drawing is of the latter type and includes a control linkage 9 for positioning the cam plate.

The transmission also includes a constant displacement replenishing pump 11 which, in a typical installation, is a gear pump and is driven by the prime mover to which the pump 1 is connected. The capacity of pump 11 is greater than the rate of leakage from the closed system system so heated oil is displaced from that system. The replenishing pump 11 is supplied with hydraulic oil from the reservoir 12 through the conduits 13 and 14 and the interior of the housing of the variable displacement pump 1. It is not essential that the supply circuit pass through the housing of the pump 1, but this is a desirable arrangement because the circulation of fluid through the housing cools the pump. Discharge from replenishing pump 11 passes into conduit 15 and then, depending upon which of the conduits 7 and 8 is the low pressure conduit, through either passage 16 and check valve 17, or through passage 18 and check valve 19 to that conduit.

Since the quantity of oil delivered by replenishing pump 11 is greater than the rate of leakage from the system, a low pressure relief valve 21 is provided to by-pass the excess oil to the reservoir 12. This valve 21 is connected with whichever of the conduits 7 and 8 is the low pressure conduit by means of a shuttle valve 22. The shuttle valve 22 includes a pair of inlet ports 23 and 24 which are connected by the passages 25 and 26 with the conduits 7 and 8, respectively, a pair of biasing ports 27 and 28 which also are connected with the passages 25 and 26, respectively, and an exhaust port 29 which is connected with the low pressure relief valve 21. Formed in the housing of shuttle valve 22 is a bore which interconnects these ports and which receives the plunger 31. This plunger is formed with a central groove 32 that defines two valve lands 33 and 34 and is biased to the neutral position shown in the drawing by a pair of coil compression springs 35 and 36. The pressures in biasing ports 27 and 28 act on opposite ends of the plunger 31 and the plunger is shifted in opposite directions from the illustrated neutral position by the pressure differential between these ports to connect port 29 with either port 23 or port 24. The exhaust port of the low pressure relief valve 21 is connected with the reservoir by conduits 37 and 38 and the interior of the housing of motor 4. As in the case of the supply circuit for the replenishing pump 11, it is desirable to pass the exhaust flow from relief valve 21 through motor 4 for purposes of cooling the parts of the motor. The conduit 38 is provided with a conventional heat exchanger 39 and a filter 41. Since the pressure in this conduit is relatively low, an inexpensive low pressure heat exchanger may be employed.

In addition to the function already described, shuttle valve 22 also serves to connect whichever of the conduits 7 and 8 is the high pressure conduit with a high pressure pilot-operated relief valve 42. The valve 42 is provided with an inlet port 43 which is connected with the ports 44 and 45 in shuttle valve 22 by passages 46 and 47, respectively, and with a pair of exhaust ports 48 and 49 which are connected with the exhaust port 29 of the shuttle valve 22 by a branched passage 51. Located in the housing of the relief valve 42 is a pilot valve 52 whose head is in communication with the inlet port 43 through a metering orifice 53 formed in a by-pass valve 54. When the pressure acting on the head of valve 52 is sufficient to overcome the force of its biasing spring, the valve 52 opens to permit flow from inlet port 43 to exhaust port 49. Since this flow passes through a metering orifice 53, the by-pass valve 54 is subject to a pressure differential which shifts it downward against the bias of its spring 55 and opens communication between inlet port 43 and exhaust port 48.

When, during operation, control linkage 9 is shifted so that pump 1 discharges into conduit 7, and conduit 8, therefore, becomes the low pressure conduit, plunger 31 of shuttle valve 32 shifts to the right thereby interconnecting ports 27 and 44, and ports 24 and 29. This action places low pressure relief valve 21 in communication with conduit 8 and connects the high pressure relief valve 42 with the conduit 7. Fluid delivered by replenishing pump 11 passes into the low pressure conduit 8 through passages 15 and 18 and check valve 19 where it replaces the fluid lost through leakage in pump 1 and motor 4. The excess fluid delivered by pump 11 displaces an equal amount of heated oil returning from motor 4 to pump 1 and causes this fluid to flow to the reservoir through low pressure relief valve 21 and passages 37 and 38. On its way back to the reservoir 12, this displaced oil is cooled in the heat exchanger 39 and cleaned in filter 31. Pressure in the high pressure conduit 7 is regulated by the high pressure relief valve 42 which, since the passage 51 is connected with the port 29, by-passes fluid into the low pressure conduit 8. This arrangement, wherein the high pressure relief valve exhausts to the low pressure side of the closed system rather than to the reservoir 12, is important because it permits high pressure relief while, at the same time, maintaining the low pressure side of the circuit liquid-filled.

If control linkage 9 is now shifted to move the cam plate of pump 1 over center, conduit 8 becomes the high pressure conduit and conduit 7 becomes the low pressure conduit. Under these conditions, plunger 31 of shuttle valve 32 shifts to the left to interconnect ports 23 and 29, and ports 28 and 45. Replenishing pump 11 now delivers fluid into conduit 7 through the passage 16 and check valve 17. The functions and operation of relief valves 21 and 42 remain unchanged except that now, relief valve 21 limits the pressure in conduit 7 and relief valve 42 limits the pressure in conduit 8.

It should be observed that this transmission employs only one low pressure relief valve and only one high pressure relief valve. This is an advantage, not only from the standpoint of cost but also because it elminates the problem of matching the settings of a plurality of relief valves. In this scheme, once the valves are adjusted, they automatically provide the same limit pressures regardless of which of the two conduits 7 and 8 is the high pressure conduit.

As stated previously, the drawing and description relate only to a preferred embodiment of the invention. Since many changes can be made in this embodiment without departing from the inventive concept, the following claims should provide the sole measure of the scope of the invention.

What is claimed is:

1. An hydraulic transmission comprising a reversible variable displacement pump having a pair of ports; a motor having a pair of ports; a pair of conduits, each connecting one port of the pump with one port of the motor; a reservoir; a replenishing pump; means defining a circuit leading from the reservoir to the replenishing pump and from that pump to each of the pair of conduits, the circuit including a check valve located between each of said pair of conduits and the replenishing pump; a low pressure relief valve having inlet and exhaust ports, the exhaust port being connected with the reservoir; a high pressure relief valve having inlet and exhaust ports; and a shuttle valve operable in response to the pressure differential between said pair of conduits for connecting the high pressure conduit with the inlet port of the high pressure relief valve and simultaneously connecting the low pressure conduit with both the inlet port of the low pressure relief valve and the exhaust port of the high pressure relief valve.

2. The hydraulic transmission defined in claim 1 in which the connection between the low pressure relief valve and the reservoir includes the interior of the housing of the motor.

3. The hydraulic transmission defined in claim 2 in which that portion of the circuit connecting the reservoir and the replenishing pump includes the interior of the housing of the reversible variable displacement pump.

4. The hydraulic transmission defined in claim 1 in which the high pressure relief valve is a pilot-operated relief valve.

References Cited in the file of this patent
UNITED STATES PATENTS

| | | |
|---|---|---|
| 1,307,839 | Williams | June 24, 1919 |
| 2,493,512 | Vickers | Jan. 3, 1950 |
| 2,541,290 | Robinson | Feb. 13, 1951 |
| 2,657,533 | Schanzlin et al. | Nov. 3, 1953 |